Patented May 4, 1926.

1,582,909

UNITED STATES PATENT OFFICE.

WALTER DUISBERG, WINFRIED HENTRICH, AND WILHELM SCHEPSS, OF WIESDORF-ON-THE-RHINE, GERMANY, ASSIGNORS, BY MESNE ASSIGNMENTS, TO GRASSELLI DYESTUFF CORPORATION, OF NEW YORK, N. Y., A CORPORATION OF DELAWARE.

TRIPHENYLMETHANE DYE.

No Drawing. Application filed June 30, 1924. Serial No. 723,349.

*To all whom it may concern:*

Be it known that we, WALTER DUISBERG, WINFRIED HENTRICH, and WILHELM SCHEPSS, citizens of Germany, residing at Wiesdorf-on-the-Rhine, in the State of Prussia, Germany, have invented new and useful Improvements in Triphenylmethane Dyes, of which the following is a specification.

U. S. Letters Patent No. 995,494 and 1,065,405 describe the preparation of violet and blue dyestuffs by condensing aniline or paratoluidine with triphenylmethane compounds obtained by the interaction of para-chlorbenzaldehyde with ortho-hydroxyaryl-carboxylic acids.

We have now found that new and valuable dyes of the triphenylmethane series can be obtained by condensing triphenylmethane dyes containing in para-position to the methane carbon a substituent, e. g., —Cl, —NO$_2$, —SO$_3$H, CH$_3$O— etc., with halogenated aromatic bases containing a substituent in ortho position, e. g., 4-chloro-2-toluidine (CH$_3$:Cl:NH$_2$=1:4:2), 5-chloro-2-toluidine (CH$_3$:Cl:NH$_2$=1:5:2), 6-chloro-2-toluidine (CH$_3$:Cl:NH$_2$=1:6:2), 4.6-dichloro-2-toluidine (CH$_3$:Cl:Cl:NH$_2$=1:4:6:2), 3-chloro-4-toluidine (CH$_3$:Cl:NH$_2$=1:3:4), 4-chloro-2-anisidine (OCH$_3$:Cl:NH$_2$=1:4:2), 4-chloro-anthranilic acid ester (COOC$_2$H$_5$:Cl:NH$_2$=1:4:2), 1-chloro-2-aminonaphthaline, etc.

The new dyes are after being dried and pulverized dark powders of a metallic lustre which are soluble in dilute caustic alkalies generally with a bluish-red, in dilute alcohol with a reddish-blue coloration. They dye wool generally from bluish-red to reddish-violet shades. When subsequently chromed they turn into pure red-violet shades. These shades are fast to milling and potting.

By treating our new products with sulfonating agents, e. g., with a mixture of monohydrated sulfuric acid and fuming sulfuric acid containing 65 percent SO$_3$ at ordinary temperature until completely soluble in water as described in U. S. Letters Patent No. 1,244,149 they become more soluble and better adapted for printing purposes. The sulfonic acids retain the valuable properties of the initial materials.

In order to illustrate the new process more fully the following example is given, the parts being by weight:—

10 parts of the dye obtainable by condensing ortho-cresotinic acid with para-chlorobenzaldehyde are slowly heated in an oil bath together with 52 parts of 6-chloro-2-toluidine (CH$_3$:Cl:NH$_2$=1:6:2) and 9 parts of its hydrochloride to 120–125° C. and kept at this temperature until the intensity of the red-violet coloration does no longer increase. The mixture is poured into water, it is rendered alkaline and the base which has not entered into reaction is driven over with steam. The residue is acidulated with hydrochloric acid, filtered off and washed.

Our new dye is after being dried and pulverized a dark powder soluble in a dilute solution of sodium carbonate with a bluish-red, in alcohol with a reddish-blue coloration and in hot sodium acetate solution with a violet-red coloration. It has most probably the formula:

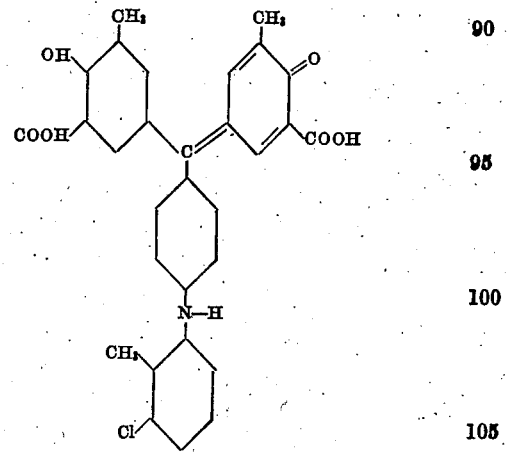

and dyes wool a bluish-red turning into a pure red-violet shade by after-chroming.

We can start from other of the above mentioned dyes of the triphenylmethane series, e. g., from the dye obtained by condensing ortho-cresotinic acid with benzaldehyde and sulfonating the resulting product and from other of the above mentioned aromatic amines.

We claim:—

1. The herein described new dyestuffs of the triarylmethane series obtainable by condensing halogenated aromatic bases containing in ortho position to the amino group a substituent with dyestuffs of the triarylmethane series containing in para position to the methane carbon a replaceable substituent, which new dyes are soluble in dilute caustic soda solution generally with a bluish-red, in dilute alcohol with a reddish-blue coloration; dyeing wool generally from bluish-red to reddish-violet shades turning into pure violet shades by afterchroming; and forming soluble sulfonic acids which retain the valuable properties of the initial materials, substantially as described.

2. The herein described new dyestuff having most probably the following formula:

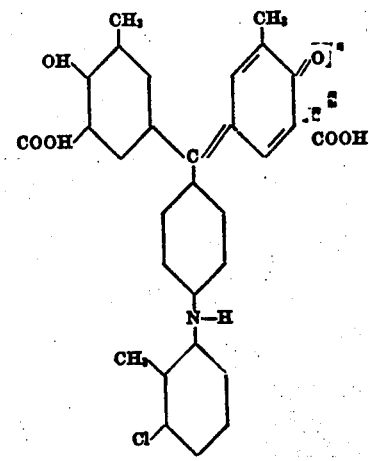

being after drying and pulverizing, a dark powder soluble in a dilute solution of sodium carbonate with a bluish-red and in alcohol with a reddish-blue coloration; dyeing wool a bluish-red turning into a pure red-violet by afterchroming, substantially as described.

In testimony whereof we have hereunto set our hands.

WALTER DUISBERG.
WINFRIED HENTRICH.
WILHELM SCHEPSS.